United States Patent
Cho (10) Patent No.: US 11,182,109 B2
(45) Date of Patent: Nov. 23, 2021

(54) DATA STORAGE DEVICE OPERATING BASED ON VIRTUAL ADDRESS, OPERATING METHOD THEREOF, AND CONTROLLER THEREFOR

(71) Applicant: SK hynix Inc., Gyeonggi-do (KR)

(72) Inventor: Sung Yeob Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 62 days.

(21) Appl. No.: 16/577,488

(22) Filed: Sep. 20, 2019

(65) Prior Publication Data
US 2020/0218475 A1    Jul. 9, 2020

(30) Foreign Application Priority Data

Jan. 7, 2019 (KR) ........................ 10-2019-0001703

(51) Int. Cl.
| | | |
|---|---|---|
| *G06F 3/06* | (2006.01) | |
| *G06F 12/0802* | (2016.01) | |
| *G06F 9/50* | (2006.01) | |
| *G06F 9/54* | (2006.01) | |

(52) U.S. Cl.
CPC .......... *G06F 3/0665* (2013.01); *G06F 3/0604* (2013.01); *G06F 3/0658* (2013.01); *G06F 3/0688* (2013.01); *G06F 9/5077* (2013.01); *G06F 9/544* (2013.01); *G06F 12/0802* (2013.01)

(58) Field of Classification Search
CPC ...... G06F 3/0604; G06F 3/061; G06F 3/0644; G06F 3/0658; G06F 3/0665; G06F 3/0688; G06F 9/5077; G06F 9/544; G06F 12/0246; G06F 12/0802; G06F 2212/1016; G06F 2212/7201; G06F 2212/7203
See application file for complete search history.

(56) References Cited

U.S. PATENT DOCUMENTS

| | | | | |
|---|---|---|---|---|
| 7,133,960 B1 * | 11/2006 | Thompson | .......... | G06F 12/0623 711/5 |
| 2006/0203595 A1 * | 9/2006 | Nguyen | .................. | G06F 12/06 365/230.01 |

FOREIGN PATENT DOCUMENTS

| | | |
|---|---|---|
| KR | 1020100037416 | 4/2010 |
| KR | 101728291 | 4/2017 |

\* cited by examiner

*Primary Examiner* — Aracelis Ruiz
(74) *Attorney, Agent, or Firm* — IP & T Group LLP (57) ABSTRACT

A data storage device includes a storage and a controller. The controller includes a storage region management circuit configured to manage the storage as plurality of logical storage regions, each corresponding to respective one of the groups of physical storage regions; an address conversion circuit configured to generate physical address including logical storage region address indicating one of the logical storage regions based on logical address; reference table configured to store relationship information among logical storage region address, physical location information indicating physical storage region corresponding to logical storage region indicated by the logical storage region address, and selection signal for activating the physical storage region; and a virtual address control circuit configured to generate the selection signal based on the logical storage region address in the physical address by referring to the reference table and transmit the selection signal and the physical address to the storage through the channel.

12 Claims, 7 Drawing Sheets

| Bus Cycle | DQ0 | DQ1 | DQ2 | DQ3 | DQ4 | DQ5 | DQ6 | DQ7 | Address information | | |
|---|---|---|---|---|---|---|---|---|---|---|---|
| 1st Cyle | A0 | A1 | A2 | A3 | A4 | A5 | A6 | A7 | | Column | A[14:0] |
| 2nd Cyle | A8 | A9 | A10 | A11 | A12 | A13 | A14 | L(1) | | | |
| 3rd Cyle | A15 | A16 | A17 | A18 | A19 | A20 | A21 | A22 | Row | Word Line | A[23:15] |
| 4th Cyle | A23 | A24(2) | A25(2) | A26 | A27 | A28 | A29 | A30 | | Block | A[35:24] |
| 5th Cyle | A31 | A32 | A33 | A34 | A35 | A36 | A37 | A38 | | LUA | A[38:36] |

DATA STORAGE DEVICE OPERATING BASED ON VIRTUAL ADDRESS, OPERATING METHOD THEREOF, AND CONTROLLER THEREFOR

CROSS-REFERENCE TO RELATED APPLICATION

The present application claims priority under 35 U.S.C. § 119(a) to Korean application number 10-2019-0001703, filed on Jan. 7, 2019, in the Korean Intellectual Property Office, which is incorporated herein by reference in its entirety.

BACKGROUND

1. Technical Field

Various embodiments generally relate to a semiconductor integrated device, and more particularly, to a data storage device, an operating method thereof, and a controller therefor.

2. Related Art

A storage device is coupled with a host device and thereby performs a data input/output operation based on a request of the host device. The storage device may use any of various storage mediums to store data.

The storage device may be a device which stores data in a magnetic disk, such as a hard disk drive (HDD), or a device which stores data in a semiconductor memory device, particularly, a nonvolatile memory, such as a solid state drive (SSD), a memory card and the like.

A storage medium which uses a flash memory provides advantages such as large capacity, nonvolatility, low cost, low power consumption and high data processing speed.

As a storage medium is configured to have a high capacity, a host device may interface with the storage medium through a plurality of channels. In this regard, it is necessary to ensure interface performance through the efficient management of the storage medium.

SUMMARY

In an embodiment, a data storage device may include: a storage configured to store data, and including a plurality of physical storage regions, which are divided into multiple groups; and a controller coupled with the storage through at least one channel, and configured to control the storage, wherein the controller includes: a storage region management circuit configured to manage the storage as a plurality of logical storage regions, each corresponding to a respective one of the groups of physical storage regions; an address conversion circuit configured to generate a physical address including a logical storage region address indicating one of the logical storage regions based on a logical address; a reference table configured to store relationship information among the logical storage region address, physical location information indicating the physical storage region corresponding to the logical storage region indicated by the logical storage region address, and a selection signal for activating the physical storage region; and a virtual address control circuit configured to generate the selection signal based on the logical storage region address in the physical address by referring to the reference table and transmit the selection signal and the physical address to the storage through the channel.

In an embodiment, a data storage device may include: a storage configured to store data, and including a plurality of physical storage regions, which are divided into multiple groups; and a controller coupled with the storage through at least one channel, and configured to: manage the storage as a plurality of logical storage regions each corresponding to a respective one of the groups of physical storage regions; and transmit a selection signal through the channel to activate, among the physical storage regions, a physical storage region corresponding to a logical storage region, which is indicated according to a logical address, among the logical storage regions.

In an embodiment, a method for operating a data storage device including a storage configured to store data and including a plurality of storage spaces which are physically divided, and a controller coupled with the storage through at least one physical channel and configured to control the storage may include: managing the storage as a plurality of logical storage regions each corresponding to a respective one of the groups of physical storage regions; generating a physical address including a logical storage region address indicating one of the logical storage regions based on a logical address; storing relationship information among the logical storage region address, physical location information indicating the physical storage region corresponding to the logical storage region indicated by the logical storage region address, and a selection signal for activating the physical storage region; generating the selection signal based on the logical storage region address in the physical address by referring to the reference table; and transmitting the selection signal and the physical address to the storage through the channel.

In an embodiment, a controller coupled with a storage which includes a plurality of physical storage regions divided into multiple groups, through at least one channel, the controller comprising: a storage region management circuit configured to manage the storage as a plurality of logical storage regions, each corresponding to a respective one of the groups of physical storage regions; an address conversion circuit configured to generate a physical address including a logical storage region address indicating one of the logical storage regions based on a logical address; a reference table configured to store relationship information among the logical storage region address, physical location information indicating the physical storage region corresponding to the logical storage region indicated by the logical storage region address, and a selection signal for activating the physical storage region; and a virtual address control circuit configured to generate the selection signal based on the logical storage region address in the physical address by referring to the reference table and transmit the selection signal and the physical address to the storage through the channel.

In an embodiment, a memory system comprising: an array of dies; and a controller coupled to the array through a channel and configured to: regard the array as a plurality of logical storage regions each corresponding to a row of dies within the array, the dies within a column of the array respectively corresponding to the logical storage regions; generate, based on a logical address, a physical address including a logical storage region address indicating one among the logical storage regions corresponding to the dies within a selected column of the array; activate, through the channel, one among the dies within the selected column according to the logical storage region address; and access the activated die according to the physical address.

In an embodiment, a method of an array of dies coupled to a channel, the array including a plurality of logical storage regions each corresponding to a row of dies within the array, the dies within a column of the array respectively corresponding to the logical storage regions, the operating method comprising: generating, based on a logical address, a physical address including a logical storage region address indicating one among the logical storage regions corresponding to the dies within a selected column of the array; activating, through the channel, one among the dies within the selected column according to the logical storage region address; and accessing the activated die according to the physical address.

DETAILED DESCRIPTION

A data storage device, an operating method thereof, and a controller therefor are described below with reference to the accompanying drawings through various embodiments. Throughout the specification, reference to "an embodiment," "another embodiment" or the like is not necessarily to only one embodiment, and different references to any such phrase are not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
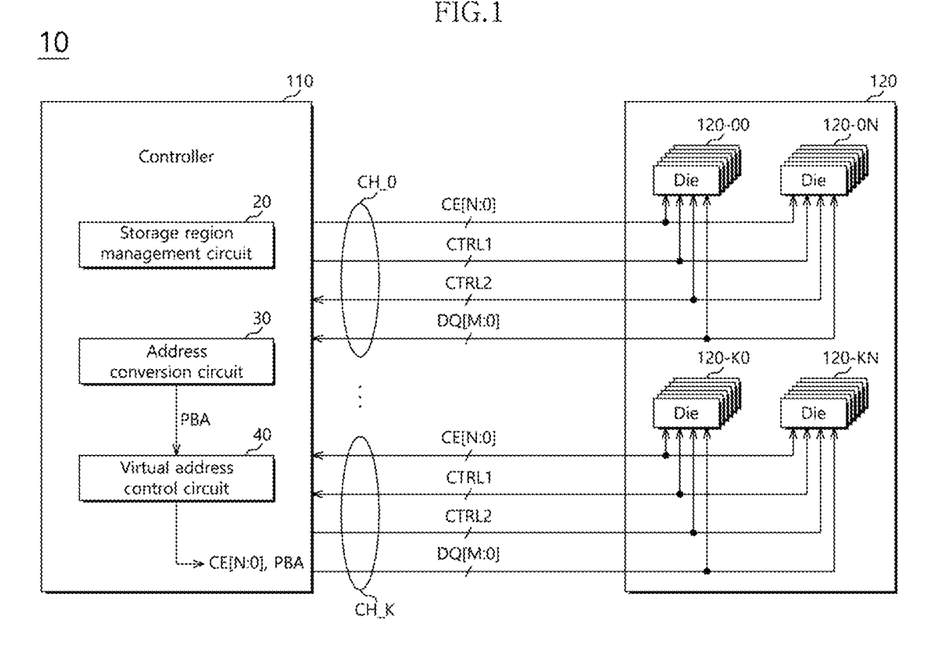
FIG. 1 is a diagram illustrating a configuration of a data storage device in accordance with an embodiment.

FIG. 1 is a diagram illustrating a configuration of a data storage device in accordance with an embodiment.

Referring to FIG. 1, a data storage device 10 may include a controller 110 and a storage 120.

The controller 110 may control the storage 120 in response to a request of a host device. For example, the controller 110 may cause data to be programmed in the storage 120, according to a program (write) request of the host device. The controller 110 may provide data recorded in the storage 120 to the host device, in response to a read request of the host device.

The storage 120 may record data or output recorded data under the control of the controller 110. The storage 120 may be configured as a volatile or nonvolatile memory device. In an embodiment, the storage 120 may be realized by using any of various nonvolatile memory devices such as an EEPROM (electrically erasable and programmable ROM), a NAND flash memory, a NOR flash memory, a PRAM (phase-change RAM), an ReRAM (resistive RAM), an FRAM (ferroelectric RAM) and/or an STT-MRAM (spin torque transfer magnetic RAM). The storage 120 may include a plurality of dies Die 0 to Die n, a plurality of chips or a plurality of packages. The storage 120 may be comprised of single level cells each storing data of one bit or multi-level cells each storing data of a plurality of bits.

In an embodiment, the storage 120 may include one or more memory groups 120-00 to 120-0N and 120-K0 to 120-KN. Each of the memory groups 120-00 to 120-0N and 120-K0 to 120-KN may include a plurality of memory dies (chips).

While not illustrated, the data storage device 10 may include a buffer memory.

The buffer memory serves as a space capable of temporarily storing data when the data storage device 10 performs a series of operations such as writing or reading data in cooperation with the host device. The buffer memory may be disposed within or externally to the controller 110.

The controller 110 may communicate with the memory groups 120-00 to 120-0N and 120-K0 to 120-KN through one or more channels CH_0 to CH_K. A plurality of memory groups among the memory groups 120-00 to 120-0N and 120-K0 to 120-KN may be coupled in common to each of the channels CH_0 to CH_K. For example, memory groups 120-00 to 120-0N may be commonly coupled to the channel CH_0 and memory groups 120-K0 to 120-KN may be commonly coupled to the channel CH_K.

Each of the channels CH_0 to CH_K may include chip select signal lines through which chip select signals CE[L:0] are transmitted, first control lines through which a first control signal CTRL1 is transmitted, second control lines through which a second control signal CTRL2 is transmitted, and input/output lines through which input/output signals DQ[M:0] are transmitted.

The chip select signals CE[L:0] are configured to select an individual memory die (chip) in each of the memory groups 120-00 to 120-0N and 120-K0 to 120-KN coupled to a corresponding one of the channels CH_0 to CH_K. That is to say, by the chip select signals CE[L:0], it is possible to select one die (chip) as an access target among memory dies (chips) in each of the memory groups 120-00 to 120-0N and 120-K0 to 120-KN coupled to a corresponding one of the channels CH_0 to CH_K.

The input/output lines may be coupled in common to the plurality of memory groups, among the memory groups 120-00 to 120-0N and 120-K0 to 120-KN, which belong to each of the channels CH_0 to CH_K. In each of the channels CH_0 to CH_K, through the input/output signals DQ[M:0], the controller 110 may transmit a command and an address to the storage 120 and exchange data with the storage 120. For example, through the channel CH_K, the controller 110 may provide the memory group 120-K0 with the input/output signals DQ[M:0] including an address, which indicates a storage region in a first die within the memory group 120-K0, while transmitting the chip select signal CE[L:0] indicating a to-be-accessed die within the memory group 120-K0. The input/output signals DQ[M:0] may include physical addresses (PBA) A[38:0], which are exemplified with reference to FIG. 4. In accordance with an embodiment of the present invention, within the physical addresses (PBA) A[38:0], a logical storage region address (LUA) A[38:36] may correspond to the chip select signal CE[L:0] indicating the to-be-accessed die within the memory group 120-K0.

Through each of the channels CH_0 to CH_K, the controller 110 may transmit the first control signal CTRL1 including a command latch enable signal CLE which indicates that the signals DQ[M:0]transmitted through the input/output lines are a command, an address latch enable signal ALE which indicates that transmitted signals are an address, a read enable signal/RE which is generated by the controller 110 in a read operation, a write enable signal/WE which is activated by the controller 110 when a command or an address is transmitted and designates a timing for latching the command or the address, and a data strobe signal DQS which is generated by the controller 110 to synchronize a data transmission timing in a read or write operation, through first control signal transmission lines to the storage 120. The second control signal CTRL2 including a ready/busy signal R/nB which indicates that the storage 120 is performing a program, erase or read operation may be provided to the controller 110 from the storage 120 through second control signal transmission lines.

In an embodiment, the controller 110 may include a storage region management circuit 20, an address conversion circuit 30 and a virtual address control circuit 40.

The storage region management circuit 20 may manage a logical storage region by logically grouping into multiple groups a plurality of physical storage regions which configure the storage 120. In an embodiment, the physical storage regions may be dies. In another embodiment, the physical storage regions may be memory blocks selected respectively from a plurality of dies within the storage 120.

The address conversion circuit 30 may be configured to generate a physical address PBA (e.g., A[38:0]) including the logical storage region address LUA (e.g., A[38:36]) from a logical address LBA transmitted by the host device.

The virtual address control circuit 40 may be configured to generate the chip select signals CE[L:0] indicating a to-be-accessed physical storage region (e.g., a die), which is among physical storage regions identified by the logical address LBA, based on the logical storage region address LUA (e.g., A[38:36]). The virtual address control circuit 40 may provide the chip select signals CE[L:0] to activate the to-be-accessed physical storage region and the physical address PBA to the storage 120.

<The Logical Storage Regions of the Storage 120>

In an embodiment, the storage region management circuit 20 of the controller 110 may manage a logical storage region by logically grouping into multiple groups a plurality of physical storage regions (i.e., dies or memory blocks) which configure the storage 120.

By way of example, the storage 120 may be realized to include one or more dies, each die may be divided into one or more planes, and each plane may be divided into a plurality of memory blocks.

In an embodiment, the storage region management circuit 20 may configure logical storage regions each corresponding to a group of dies from one of the memory groups 120-00 to 120-0N and 120-K0 to 120-KN coupled to respective channels CH_0 to CH_K.

In an embodiment, the storage region management circuit 20 may configure logical storage regions each corresponding to a group of memory blocks selected respectively from dies of one of the memory groups 120-00 to 120-0N and 120-K0 to 120-KN coupled to respective channels CH_0 to CH_K.

In other words, a logical storage region may be configured by, but not limited to, grouping a plurality of dies or grouping a plurality of blocks dispersed among a plurality of dies. In particular, in the case where a logical storage region is configured by grouping a plurality of blocks, the plurality of blocks selected from a plurality of dies may have the same offset or different offsets in the corresponding dies or planes.

Figure 2:
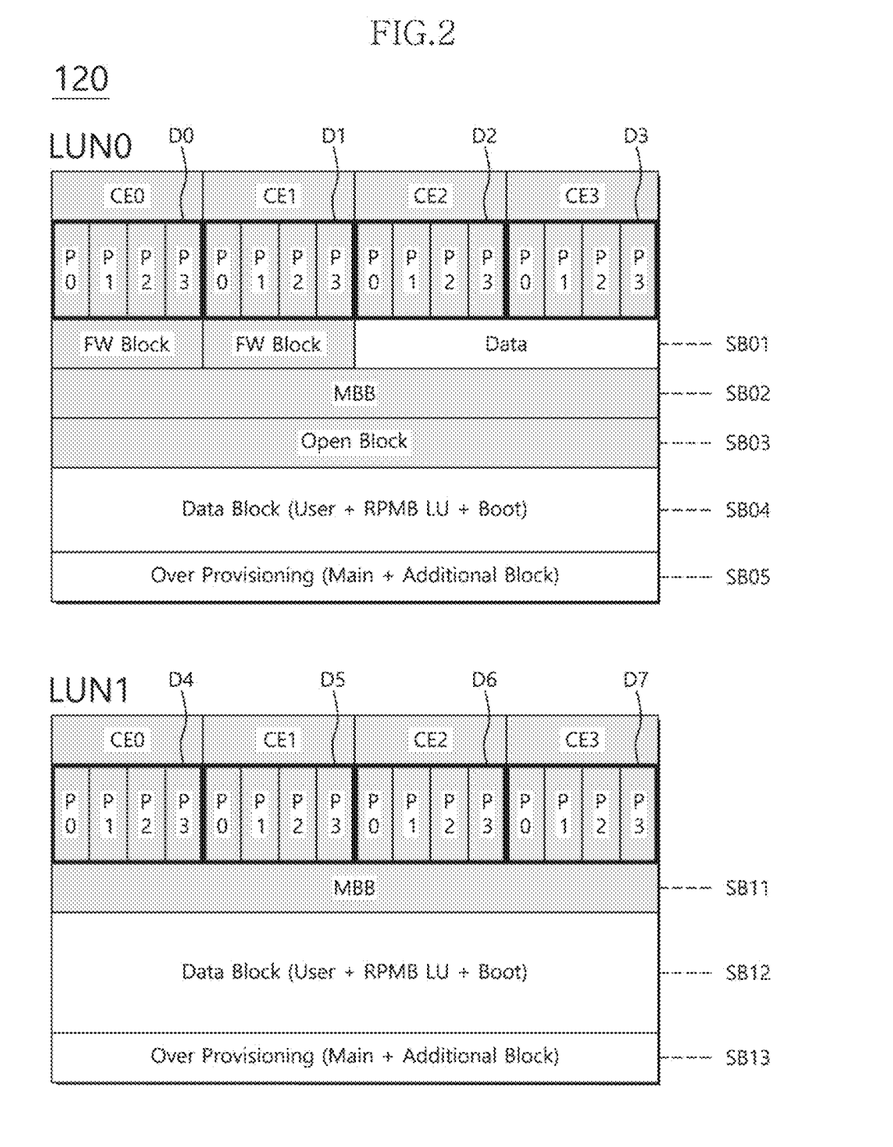
FIG. 2 is a diagram illustrating a configuration of a storage in accordance with an embodiment.

FIG. 2 is a diagram illustrating a configuration of the storage 120 in accordance with an embodiment. FIG. 2 schematically illustrates the storage 120 in the context of it being logically managed by the storage region management circuit 20.

Referring to FIG. 2, the storage 120 may include a plurality of dies D0 to D7. Each of the dies D0 to D7 may be divided into a plurality of planes P0 to P3.

The storage region management circuit 20 may configure two logical storage regions LUN0 and LUN1 each by grouping a designated number of dies, for example, four dies as shown in FIG. 2. Each logical storage region LUN0 or LUN1 may be identified by a logical storage region address LUA.

Among the blocks in respective dies in the logical storage regions LUN0 and LUN1, combinations of blocks which have the same or different offsets may configure super blocks SB01 to SB05 and SB11 to SB13.

The super blocks SB01 to SB05 and SB11 to SB13 may be divided into firmware storage regions (FW Block), bad block management regions (MBB) for bad block marking, over-provisioning regions (Over Provisioning), a region in use (Open Block) and data blocks (Data Block) in which user data and the like are stored.

As the storage 120 has four groups CE0 to CE3, each of which is managed as the logical storage regions LUN0 and LUN1, firmware codes may be stored in only a selected logical storage region, and a bad block may be managed in each of the logical storage regions LUN0 and LUN1, whereby the management efficiency of the storage 120 may be maximized.

According to the logical storage region structure of the present invention, the storage region management circuit 20 may identify the eight dies D0 to D7 as four groups: a first group CE0 of dies D0 and D4, a second group CE1 of dies D1 and D5, a third group CE2 of dies D2 and D6 and a fourth group CE3 of dies D3 and D7. These groups CE0 to CE3 may be selected according to the logical address LBA provided from the host. Within each of the groups CE0 to CE3, dies may be selected by the logical storage region address LUN0 and LUN1. For example, the first group CE0 of dies D0 and D4 may be selected according to the logical address LBA and, within the first group CE0 of dies, die D4 may be selected by the logical storage region address LUN1.

That is, according to the logical storage region structure, the logical storage regions LUN0 and LUN1 may correspond to four dies D0 to D3 and four dies D4 to D7, respectively. The dies may be selected, from the logical address LBA, by units of groups (e.g., the first to fourth groups CE0 to CE3) of dies selected from different logical storage regions LUN0 and LUN1. For example, the first group CE0 of the dies D0 and D4, which are selected from the different logical storage regions LUN0 and LUN1, may be selected among the first to fourth groups CE0 to CE3 according to the logical address LBA. Within the selected first group CE0, one of the dies D0 to D4 may be selected by the logical storage region address LUN0 and LUN1. For example, from the selected first group CE0 of dies D0 and D4, the die D4 may be selected by the logical storage region address LUN1.

When compared with the logical storage region structure, the die D4 may be selected by the chip select signal CE4 according to the physical storage region structure, within which the eight dies D0 to D7 are selected respectively by the chip select signals CE[7:0].

When comparing the logical storage region structure and the physical storage region structure, a super block may be configured from the eight dies D0 to D7 according to the physical storage region structure while configured from four dies D0 to D3 or D4 to D7 according to the logical storage region structure. That is, the logical storage region structure has more flexibility in terms of managing the storage regions than the physical storage region structure.

<An Access to the Storage 120>

As the storage region management circuit 20 manages the storage 120 as logical storage regions, the address conversion circuit 30 may generate, when generating a physical address PBA from a logical address LBA provided from the host device, the physical address PBA including the logical storage region address (e.g., the logical region address LUN0 or LUN1) for identifying each logical storage region while the storage region management circuit 20 selects a corresponding group of dies (i.e., one among the first to fourth groups CE0 to CE3 of dies as exemplified above) according to the logical address LBA. The storage region management circuit 20 may provide the address conversion circuit 30 with the logical storage region address LUN0 or LUN1 corresponding to the logical address LBA.

In the case of accessing the storage 120 by using a logical storage region address, even when processing commands (such as Read ID, Get Feature, Read Status, Unique ID, Hard Reset, SET/Get Parameter and the like) for which the input of addresses is not necessary, a command for selecting a logical storage region and an address signal for selecting a detailed location (a block address and a page address) in a selected logical storage region need to be inputted to the storage 120. As a result, interface overhead may be caused and processing time may be increased.

In order to eliminate such overhead, the controller 110 in accordance with an embodiment of the present technology may manage physical location information corresponding to each logical storage region in the storage 120. If an access request together with a logical address LBA for a certain logical storage region indicated by the logical address LBA is transmitted, physical location information corresponding to the access-requested logical storage region may be identified from the logical storage region address LUA in the physical address PBA, which is translated from the logical address LBA. Then, the physical storage region indicated by the physical location information may be activated through the channels CH_0 to CH_K.

Referring back to FIG. 1, when generating a physical address PBA from a logical address LBA provided from the host device, the address conversion circuit 30 may generate the physical address PBA including a logical storage region address LUA indicating a access-requested logical storage region while the group of dies (e.g., one among the first to fourth groups CE0 to CE3 of dies) is selected according to the logical address LBA. Within the group of dies (e.g., the first group of dies D0 and D4) selected according to the logical address LBA, a die (e.g., the die D0 or D4) may be identified by the logical storage region address LUA (e.g., the logical storage region address LUN0 or LUN1), as illustrated in FIG. 2.

The virtual address control circuit 40 may manage physical location information of the storage 120 for each logical storage region, which are described with reference to a reference table 403 (e.g., Table 1). If an access request together with a logical address LBA for a certain logical storage region is provided, the virtual address control circuit 40 may identify, according to the reference table 403, a corresponding physical location information from the logical storage region address LUA in the physical address PBA translated from the logical address LBA by the address conversion circuit 30. The virtual address control circuit 40 may generate the chip select signals CE[L:0] for activating the physical storage region indicated by the physical location information. As illustrated above, a group of dies (e.g., the first group CE0 of dies D0 and D4 among the first to fourth groups CE0 to CE3) is selected according to the logical address LBA. Within the selected group of dies (e.g., the first group of dies D0 and D4), a die (e.g., the die D0 or D4) may be identified by the physical location information, which corresponds to the logical storage region address (e.g., the logical storage region address LUN0 or LUN1) in the reference table 403. The virtual address control circuit 40 may further generate chip select signals CE[L:0] for activating the die D0 or D4 indicated by the physical location information corresponding to the logical storage region address LUN0 or LUN1. The chip select signals CE[L:0] for activating the die D0 or D4 may be transferred through a corresponding one among the channels CH_0 to CH_K. A column line and a row line in a physical storage region activated by the chip select signals CE[L:0] may be selected by the physical address PBA.

In an embodiment, the virtual address control circuit 40 may use, but not limited to, the chip select signal CE for activating a physical storage region indicated by the physical location information corresponding to the logical storage region address.

In an embodiment, in the case where a logical storage region (e.g., the logical storage region LUN0 or LUN1) is configured by grouping a plurality of dies (e.g., the first to fourth dies D0 to D3 or to the fifth to eighth dies D4 to D7), the physical location information corresponding to the logical storage region address LUN0 or LUN1 indicating the logical storage region may indicate one (e.g., the die D0 or D4) which configures the logical storage region LUN0 or LUN1 among the plurality of dies (e.g., the first group CE0 of dies D0 and D4). For example, the first group CE0 of dies D0 and D4 may be selected among the first to fourth group CE0 to CE3 of the eight dies D0 to D7 according to the access-requested logical address LBA. In an embodiment, in the case where a logical storage region is configured by grouping a plurality of blocks, the physical location information corresponding to the logical storage region address indicating the logical storage region may indicate dies (e.g., the first to fourth dies D0 to D3 or the fifth to eighth dies D4 to D7) in which the plurality of blocks configuring the logical storage region LUN0 or LUN1 is included.

Therefore, in the case where the host device provides a logical address LBA to access a certain location of the storage 120, the address conversion circuit 30 may generate a physical address PBA corresponding to the logical address LBA. As described above, the storage region management circuit 20 may provide the address conversion circuit 30 with the logical storage region address LUN0 or LUN1 corresponding to the logical address LBA while selecting a corresponding group of dies (i.e., one among the first to fourth groups CE0 to CE3 of dies as exemplified above) according to the logical address LBA. The address conversion circuit 30 may generate the physical address PBA including the logical storage region address LUN0 or LUN1 indicating the logical storage region within the selected group of dies (e.g., the first group CE0 of dies D0 and D4).

The virtual address control circuit 40 may extract a logical storage region address LUN0 or LUN1 from the physical address PBA generated by the address conversion circuit 30, may translate, according to the reference table 403 (e.g., Table 1), the logical storage region address LUN0 or LUN1 into the physical location information indicating a die (e.g., the die D0 or D4) within a selected one (e.g., the first group CE0 of the dies D0 and D4) among the plural groups of dies (e.g., the first to fourth groups CE0 to CE3 of eight dies D0 to D7 as exemplified in FIG. 2), may generate one among the chip select signals CE[L:0] for activating the die indicated by the physical location information corresponding to the logical storage region address LUN0 or LUN1 and may transmit the generated chip select signal CE[L:0] together with the physical address PBA to the storage 120. Accordingly, the die indicated by the physical storage information in the storage 120 may be activated, and a storage space corresponding to a column address and a row address included in the physical address PBA may be selected, that is, accessed.

Figure 3:
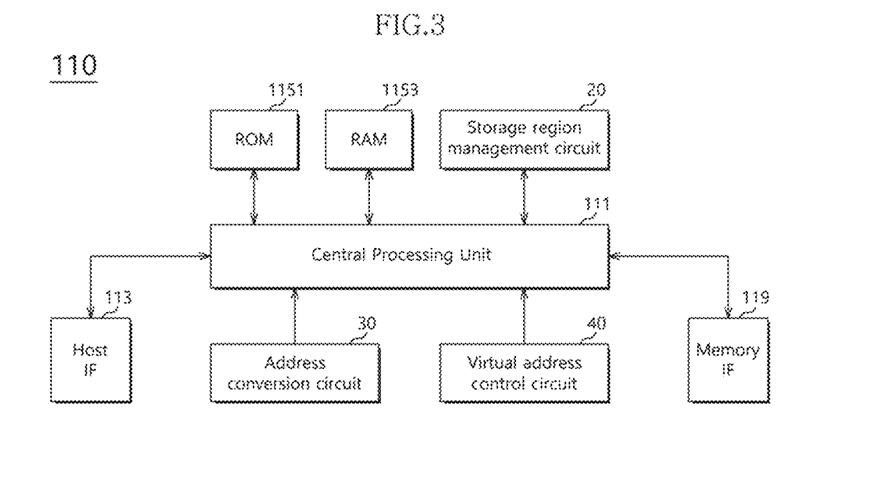
FIG. 3 is a diagram illustrating a configuration of a controller in accordance with an embodiment.

FIG. 3 is a diagram illustrating a configuration of the controller in accordance with an embodiment.

Referring to FIG. 3, the controller 110 may include a central processing unit (CPU) 111, a host interface 113, a ROM 1151, a RAM 1153, a memory interface 119, a storage region management circuit 20, an address conversion circuit 30, and a virtual address control circuit 40.

The CPU 111 may be configured to transfer various control informations necessary for a data read or write operation for the storage 120, to the host interface 113, the RAM 1153, the memory interface 119, the storage region management circuit 20, the address conversion circuit 30 and the virtual address control circuit 40. In an embodiment, the CPU 111 may operate according to firmware provided for various operations of the data storage device 10. In an embodiment, the CPU 111 may perform the function of a flash translation layer (FTL) for performing garbage collection, wear leveling and the like to manage the storage 120, and the function of detecting and correcting an error of data read from the storage 120.

The host interface 113 may provide a communication channel for receiving a command and a clock signal from the host device and controlling input/output of data, under the control of the CPU 111. In particular, the host interface 113 may provide a physical coupling between the host device and the data storage device 10. Further, the host interface 113 may provide interfacing with the data storage device 10 in correspondence to the bus format of the host device. The bus format of the host device may include at least any one among standard interface protocols, such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The ROM 1151 may store program codes necessary for the operation of the controller 110, for example, firmware or software, and may store code data used by the program codes.

The RAM 1153 may store data or program codes necessary for the operation of the controller 110 or data generated by the controller 110. The CPU 111 may use the RAM 1153 as a buffer memory, a cache memory or a working memory. For example, the CPU 111 may temporarily store data to be transmitted and received between the host device and the storage 120, in the RAM 1153, or may load program codes stored in the storage 120 to the RAM 1153 and then drive the program codes.

In a booting operation, the CPU 111 may control the booting operation of the data storage device 10 by loading boot codes stored in the storage 120 or the ROM 1151 to the RAM 1153 and then driving the boot codes.

The memory interface 119 may provide a communication channel for transmission and reception of signals between the controller 110 and the storage 120. The memory interface 119 may write data temporarily stored in the RAM 1153 or a separate buffer memory, in the storage 120, under the control of the CPU 111. Moreover, the memory interface 119 may transfer data read from the storage 120 to the RAM 1153 or a separate buffer memory and thereby temporarily store the data.

The storage region management circuit 20 may manage a logical storage region by logically grouping a plurality of physical storage regions which configure the storage 120, as described with reference to FIG. 2.

In an embodiment, the storage 120 may include at least one die including at least one plane which is divided into a plurality of blocks. The storage region management circuit 20 may configure a plurality of logical storage regions LUN0 and LUN1 each corresponding to plural dies D0 to D3 and D4 to D7 (e.g., the dies D0 to D3 for the logical storage region LUN0 and the dies D4 to D7 for the logical storage region LUN1 as exemplified in FIG. 2) or each corresponding to a group of blocks selected from one among the memory groups 120-00 to 120-0N and 120-K0 to 120-KN coupled to respective channels CH_0 to CH_K.

In other words, a logical storage region may be configured by, but not limited to, grouping a plurality of dies or grouping a plurality of blocks dispersed in a plurality of dies. In particular, in the case where a logical storage region is configured by grouping a plurality of blocks, the plurality of blocks selected from a plurality of dies may have the same offset or different offsets in the corresponding dies or planes.

The storage region management circuit 20 may provide the address conversion circuit 30 with the logical storage region address LUN0 or LUN1 corresponding to the logical address LBA while selecting a corresponding group of dies (i.e., one among the first to fourth groups CE0 to CE3 of dies D0 to D7 as exemplified with reference to FIG. 2) according to the logical address LBA.

The address conversion circuit 30 may be configured to generate a physical address PBA from the logical address LBA transmitted together with an access request of the host device. The address conversion circuit 30 may generate the physical address PBA including the logical storage region address LUN0 or LUN1 for identifying the access-requested logical storage region while the storage region management circuit 20 selects a corresponding group of dies (i.e., one among the first to fourth groups CE0 to CE3 of dies D0 to D7 as exemplified with reference to FIG. 2) according to the logical address LBA.

The physical address PBA generated by the address conversion circuit 30 may be represented by a plurality of bits, and may be provided to the virtual address control circuit 40 through a plurality of cycles.

Figure 4:
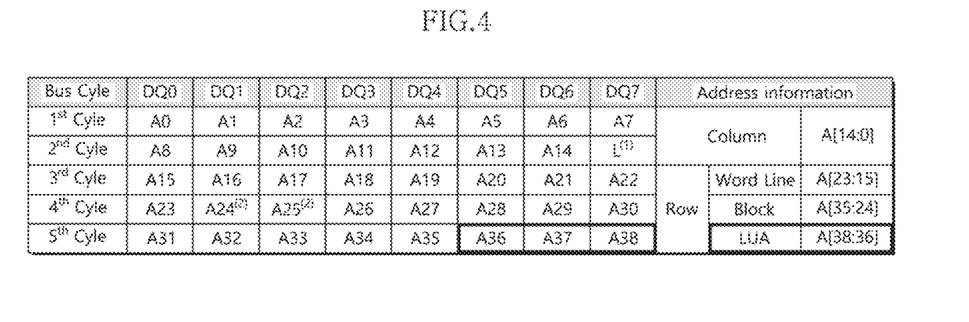
FIG. 4 is a diagram to assist in the explanation of the concept of addressing in accordance with an embodiment.

FIG. 4 is a diagram to assist in the explanation of the concept of addressing in accordance with an embodiment.

Referring to FIG. 4, a physical address A[38:0] generated in the address conversion circuit 30 may include a column address A[14:0] and a row address A[38:15]. The row address A[38:15] may include a word line address A[23:15], a block address A[35:24] and a logical storage region address A[38:36]. The physical address A[38:0] may correspond to the physical address PBA and the logical storage region address A[38:36] may correspond to the logical storage region address LUN0 or LUN1.

The physical address A[38:0] may be outputted through, but not limited to, five cycles as illustrated in FIG. 4. A physical address signal to be transmitted per cycle may be eight bits. As a matter of course, the number of address cycles for addressing the storage 120 and the number of address bits to be transmitted per cycle may be changed depending on the size of the storage 120.

The virtual address control circuit 40 may be provided with a physical address A[38:0], which includes a logical storage region address A[38:36], from the address conversion circuit 30 and may extract the logical storage region address A[38:36] from the physical address A[38:0].

The virtual address control circuit 40 may manage the mapping information between a logical storage region address A[38:36] and physical location information indicating the physical storage regions corresponding to the logical storage region indicated by the logical storage region address A[38:36]. For example, in the case where a logical storage region is configured by grouping a plurality of dies, the virtual address control circuit 40 may manage the mapping information between a logical storage region address A[38:36] and the physical location information indicating the dies corresponding to the logical storage region indicated by the logical storage region address A[38:36]. In the case where a logical storage region is configured by grouping blocks selected from a plurality of dies, the virtual address control circuit 40 may manage the mapping information between a logical storage region address A[38:36] and the physical location information indicating the dies including the selected blocks corresponding to the logical storage region indicated by the logical storage region address A[38:36].

Therefore, the virtual address control circuit 40 may provide the chip select signals CE[L:0] for activating the dies corresponding to the logical storage region indicated by the logical storage region address A[38:36] by extracting the logical storage region address A[38:36] from the physical address A[38:0] and translating, from the logical storage region address A[38:36], the physical location information indicating the dies corresponding to the logical storage region indicated by the logical storage region address A[38:36]. The chip select signals CE[L:0] may be provided to the storage 120 through the channels CH_0 to CH_K.

Figure 5:
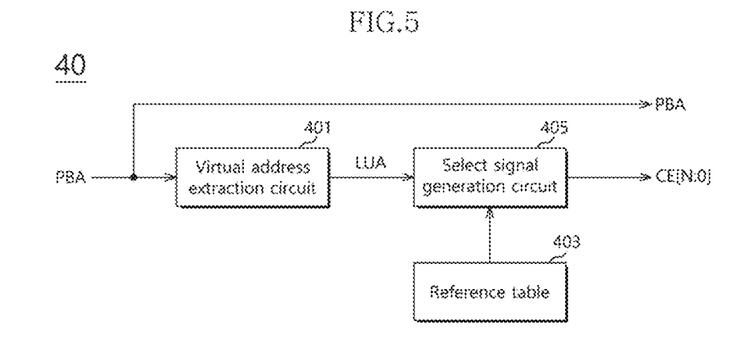
FIG. 5 is a diagram illustrating a configuration of a virtual address control circuit in accordance with an embodiment.

FIG. 5 is a diagram illustrating a configuration of the virtual address control circuit in accordance with an embodiment.

Referring to FIG. 5, the virtual address control circuit 40 may include a virtual address extraction circuit 401, a reference table 403 and a select signal generation circuit 405.

The virtual address extraction circuit 401 may be configured to be provided with a physical address A[38:0] from the address conversion circuit 30 and extract a logical storage region address (LUA) A[38:36] from the physical address A[38:0].

The reference table 403 may store a mapping information between a logical storage region address A[38:36] and a physical location information indicating physical storage regions corresponding to the logical storage region indicated by the logical storage region address A[38:36].

In the case where a logical storage region is configured to include a plurality of dies, the reference table 403 may store mapping information between the logical storage region address A[38:36] and the physical location information indicating the plurality of dies corresponding to the logical storage region indicated by the logical storage region address A[38:36]. Also, the reference table 403 may have the chip select signals CE[L:0] corresponding to the dies as exemplified in Table 1.

TABLE 1

| Logical Storage Region Address (LUA) | Physical Location Information (Die#) | Enable Signal Information (CE#) |
|---|---|---|
| A[38:36] | Die0 <br> □ <br> DieL | CE0 <br> □ <br> CEL |

As illustrated above, a group of dies (e.g., the first group CE0 of dies D0 and D4 among the first to fourth groups CE0 to CE3 of dies D0 to D7 as exemplified in FIG. 2) is selected according to the logical address LBA. Within the selected group of dies (e.g., the first group CE0 of dies D0 and D4), a die (e.g., the die D0 or D4) may be identified by the physical location information, which corresponds to the logical storage region address A[38:36] in the reference table 403. The virtual address control circuit 40 may generate a chip select signal CE0 or CE4 for activating the die D0 or D4 indicated by the physical location information corresponding to the logical storage region address A[38:36]. The chip select signal CE0 or CE4 for activating the die D0 or D4 may be transferred through the corresponding channel CH_0.

The select signal generation circuit 405 may generate the chip select signals CE[L:0] for activating physical storage region or the dies corresponding to the logical storage region indicated by the logical storage region address A[38:36], by referring to the reference table 403. The chip select signals CE[L:0] may be transmitted to the storage 120 through preset lines in each of the channels CH_0 to CH_K, for example, chip select signal lines or control signal transmission lines, and thereby, may activate a corresponding physical storage space, for example, a die. Also, the select signal generation circuit 405 may transmit a physical address PBA to the storage 120 through input/output lines such that a storage space corresponding to a specified row line and column line in the activated physical storage space may be accessed.

Figure 6:
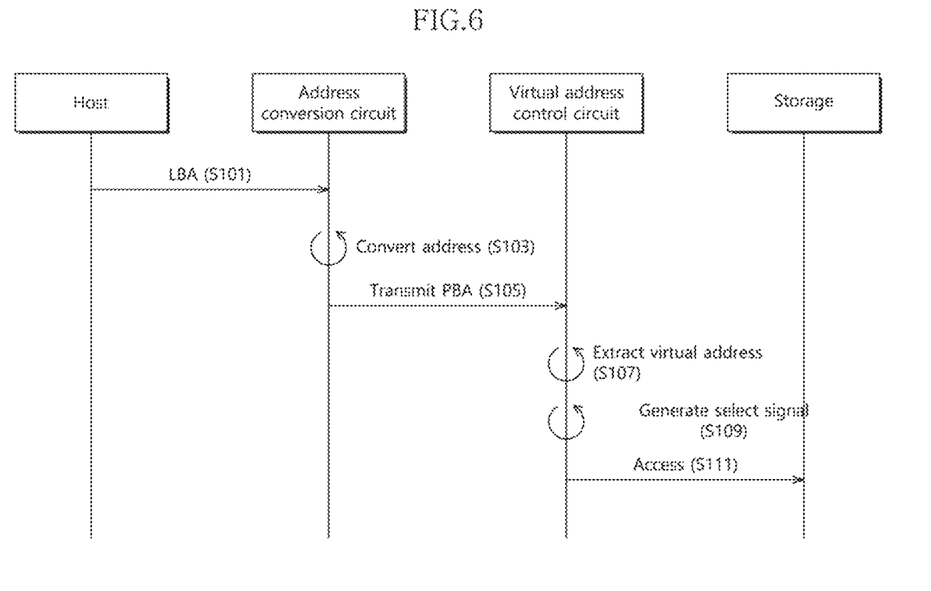
FIG. 6 is a flow chart to assist in the explanation of a method for operating a data storage device in accordance with an embodiment.

FIG. 6 is a flow chart to assist in the explanation of a method for operating a data storage device in accordance with an embodiment.

As an access request for read or write of data and a logical address LBA are received from the host device (S101), the address conversion circuit 30 of the controller 110 may convert the logical address LBA into a physical address PBA (S103). The address conversion circuit 30 may transmit the converted physical address PBA to the virtual address control circuit 40 (S105).

The virtual address control circuit 40 may extract a logical storage region address LUA included in the physical address PBA (S107). Through the physical location information corresponding to the logical storage region address LUA within the reference table 403, the chip select signals CE[L:0] may be generated (S109). The chip select signals CE[L:0] and the physical address PBA are transmitted to the storage 120 through preset lines in each of the channels CH_0 to CH_K such that a corresponding physical storage space may be accessed (S111). For example, a die corresponding to the access-requested logical storage region may be activated by the chip select signals CE[L:0], and a storage space corresponding to a specified row line and column line in the activated die may be selected based on the physical address PBA.

Figure 7:
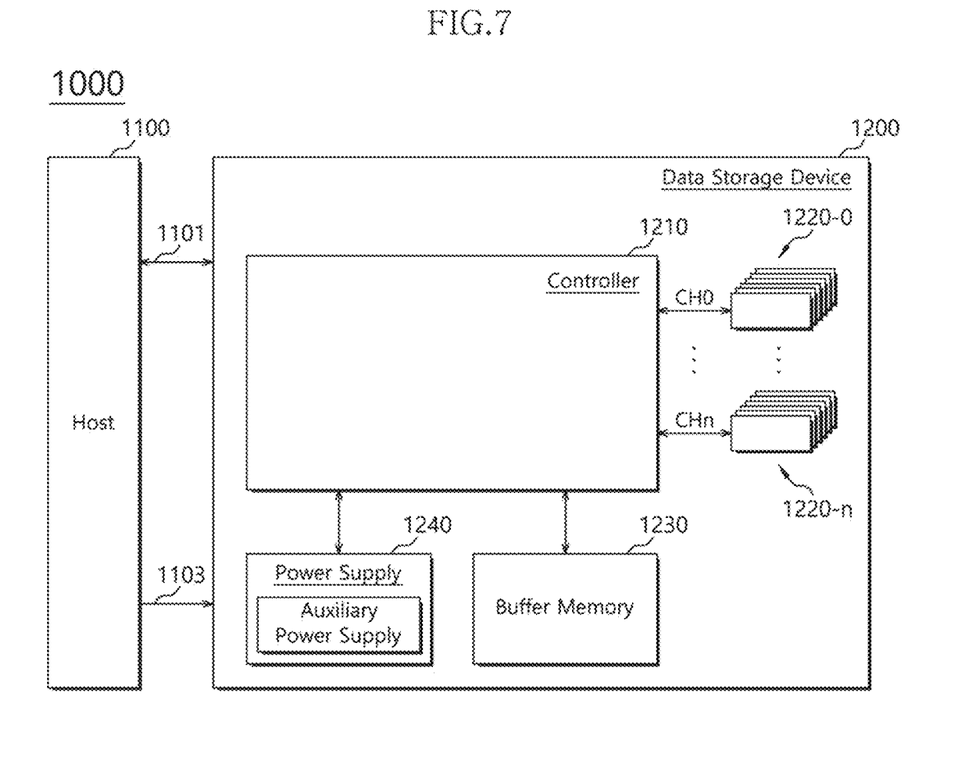
FIG. 7 is a diagram illustrating a data storage system in accordance with an embodiment.

FIG. 7 is a diagram illustrating a data storage system in accordance with an embodiment.

Referring to FIG. 7, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component, and a memory interface. In an embodiment, the controller 1210 may configured as the controller as shown is FIG. 1, FIG. 3 and/or FIG. 5.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH1 to CHn, respectively. One or more nonvolatile memory devices may be coupled to the same channel. The nonvolatile memory devices coupled to the same channel may be coupled to the same signal bus and data bus.

The power supply 1240 may provide power inputted through the power connector 1103, to the inside of the data storage device 1200. The power supply 1240 may include an auxiliary power supply. The auxiliary power supply may supply power to allow the data storage device 1200 to be properly terminated when a sudden power-off occurs. The auxiliary power supply may include large capacity capacitors.

The signal connector 1101 may be configured as any of various types of connectors depending on an interface scheme between the host device 1100 and the data storage device 1200.

The power connector 1103 may be configured as any of various types of connectors depending on a power supply scheme of the host device 1100.

Figure 8:
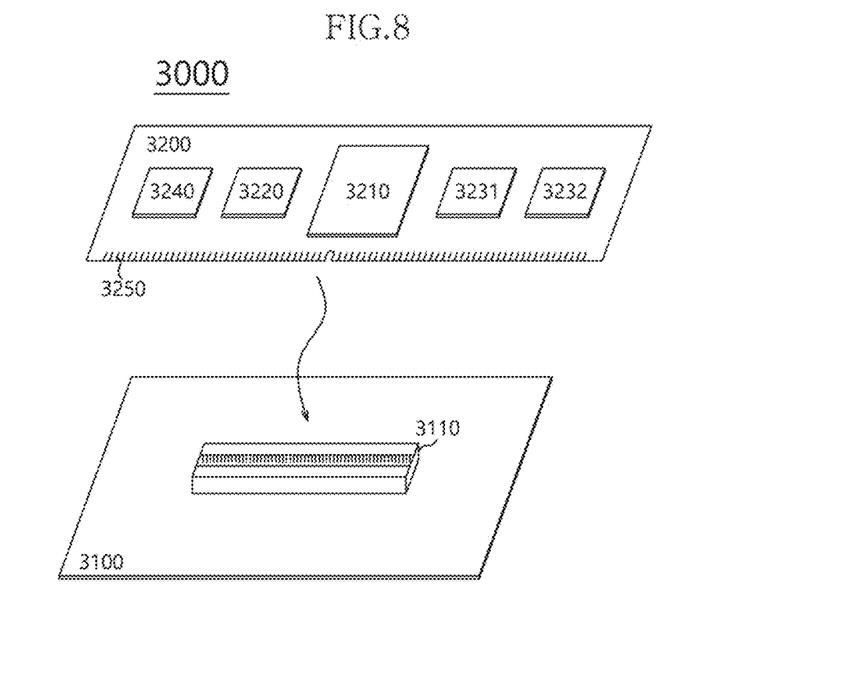
FIG. 8 and FIG. 9 are diagrams illustrating a data processing system in accordance with an embodiment.

FIG. 8 is a diagram illustrating a data processing system in accordance with an embodiment. Referring to FIG. 8, the data processing system 3000 may include a host device 3100 and the memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. In this case, the memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIG. 1, FIG. 3 and FIG. 5.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200.

The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and the like, as well as power, may be transferred between the host device 3100 and the memory system 3200. The connection terminal 3250 may be configured as any of various types depending on an interface scheme between the host device 3100 and the memory system 3200. The connection terminal 3250 may be disposed on any one side of the memory system 3200.

Figure 9:
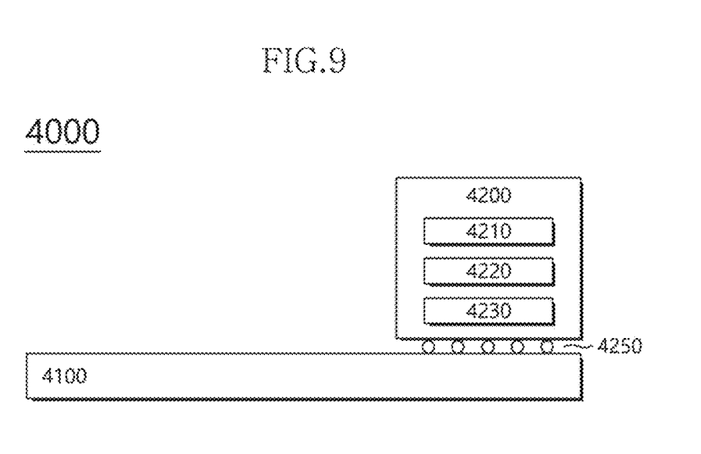

FIG. 9 is a diagram illustrating a data processing system in accordance with an embodiment. Referring to FIG. 9, the data processing system 4000 may include a host device 4100 and the memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIG. 1, FIG. 3 and/or FIG. 5.

The buffer memory device 4220 may temporarily store data to be stored in the nonvolatile memory device 4230.

Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
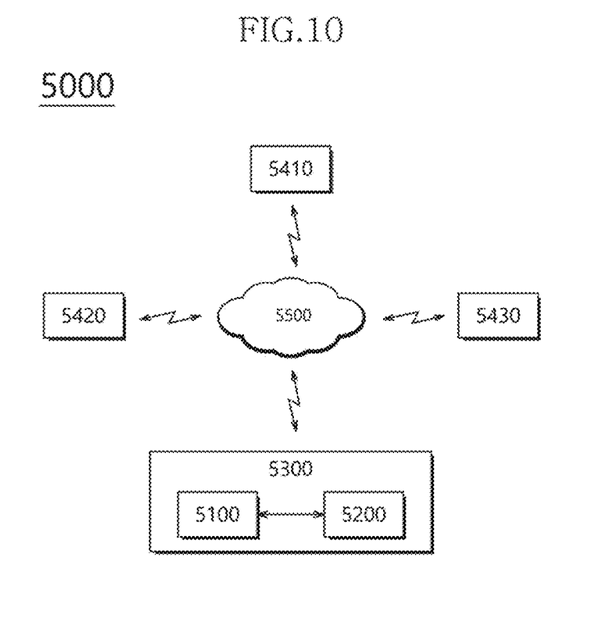
FIG. 10 is a diagram illustrating a network system including a data storage device in accordance with an embodiment.

FIG. 10 is a diagram illustrating a network system including a data storage device in accordance with an embodiment. Referring to FIG. 10, the network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and the memory system 5200. The memory system 5200 may be configured as the memory system 10 shown in FIG. 1, the data storage device 1200 shown in FIG. 7, the memory system 3200 shown in FIG. 8 or the memory system 4200 shown in FIG. 9.

Figure 11:
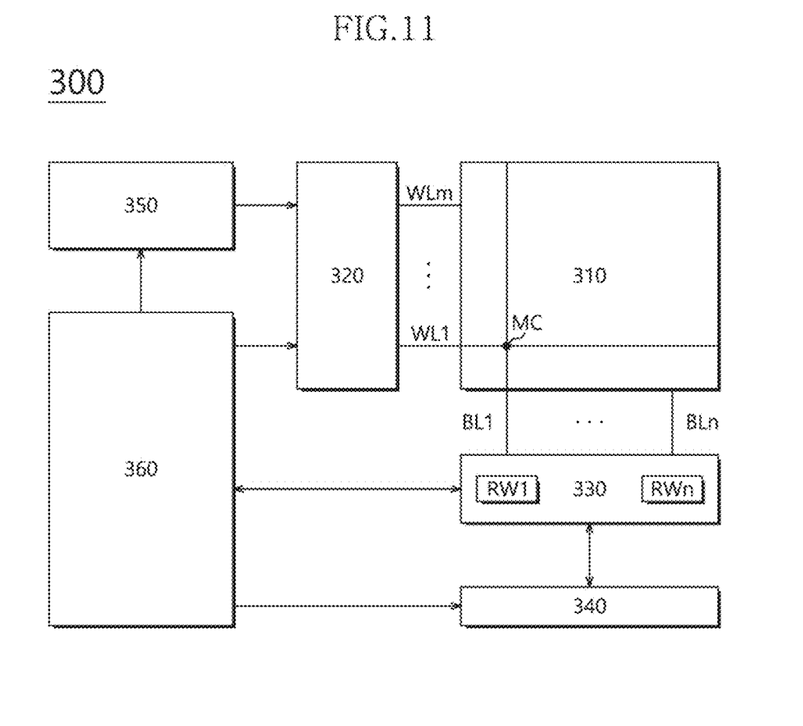
FIG. 11 is a block diagram illustrating a nonvolatile memory device included in a data storage device in accordance with an embodiment.

FIG. 11 is a block diagram illustrating a nonvolatile memory device included in a data storage device in accordance with an embodiment. Referring to FIG. 11, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array having a base on the flat surface of a semiconductor substrate and also extending in a direction substantially perpendicular to the flat surface. Moreover, the three-dimensional memory array means a structure including NAND strings which one memory cell is located vertically above (or above in the direction perpendicular to the flat surface of the substrate) another memory cell.

In general, the three-dimensional memory array structure can be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data to read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been illustrated and described, it will be understood by those skilled in the art that the embodiments described are examples only. Accordingly, the present invention is not limited to or by the described embodiments. Rather, the present invention encompasses all modifications and variations of any of the disclosed embodiments that fall within the scope of the claims and their equivalents.

What is claimed is:

1. A data storage device comprising:
a storage configured to store data, and including a plurality of physical storage regions, which are divided into multiple groups; and
a controller coupled with the storage through at least one channel, and configured to control the storage,
wherein the controller includes:
a storage region management circuit configured to manage the storage as a plurality of logical storage regions, each corresponding to a respective one of the groups of physical storage regions;
an address conversion circuit configured to generate a physical address including a logical storage region address indicating one of the logical storage regions based on a logical address transmitted by a host device;
a reference table configured to store relationship information among the logical storage region address, physical location information indicating the physical storage region corresponding to the logical storage region indicated by the logical storage region address, and a selection signal for activating the physical storage region; and
a virtual address control circuit configured to generate the selection signal based on the logical storage region address in the physical address by referring to the reference table and transmit the selection signal and the physical address to the storage through the channel.

2. The data storage device according to claim 1, wherein each of the physical storage regions is configured as a memory chip.

3. The data storage device according to claim 2,
wherein the logical storage region address in the physical address indicates the memory chip corresponding to the logical storage region indicated by the logical storage region address, and
wherein the selection signal is a chip select signal for activating the memory chip corresponding to the logical storage region indicated by the logical storage region address.

4. The data storage device according to claim 1, wherein each of the physical storage regions is configured by a plurality of memory blocks respectively selected from a plurality of memory chips.

5. The data storage device according to claim 4,
wherein the logical storage region address in the physical address indicates the memory chip including the selected memory block corresponding to the logical storage region indicated by the logical storage region address, and
wherein the selection signal is a chip select signal for activating the memory chip including the selected memory block corresponding to the logical storage region indicated by the logical storage region address.

6. A controller coupled with a storage which includes a plurality of physical storage regions divided into multiple groups, through at least one channel, the controller comprising:
a storage region management circuit configured to manage the storage as a plurality of logical storage regions, each corresponding to a respective one of the groups of physical storage regions;
an address conversion circuit configured to generate a physical address including a logical storage region address indicating one of the logical storage regions based on a logical address transmitted by a host device;
a reference table configured to store relationship information among the logical storage region address, physical location information indicating the physical storage region corresponding to the logical storage region indicated by the logical storage region address, and a selection signal for activating the physical storage region; and
a virtual address control circuit configured to generate the selection signal based on the logical storage region address in the physical address by referring to the reference table and transmit the selection signal and the physical address to the storage through the channel.

7. The controller according to claim 6, wherein each of the physical storage regions is configured as a memory chip.

8. The controller according to claim 7,
wherein the logical storage region address in the physical address indicates the memory chip corresponding to the logical storage region indicated by the logical storage region address, and
wherein the selection signal is a chip select signal for activating the memory chip corresponding to the logical storage region indicated by the logical storage region address.

9. The controller according to claim 6, wherein each of the physical storage regions is configured as a plurality of memory blocks respectively selected from a plurality of memory chips.

10. The controller according to claim 9,
wherein the logical storage region address in the physical address indicates the memory chip including the selected memory block corresponding to the logical storage region indicated by the logical storage region address, and
wherein the selection signal is a chip select signal for activating the memory chip including the selected memory block corresponding to the logical storage region indicated by the logical storage region address.

11. A memory system comprising:
an array of physical dies; and
a controller coupled to the array through a channel and configured to:
regard the array as a plurality of logical storage regions each corresponding to a row of physical dies within the array, the physical dies within a column of the array respectively corresponding to the logical storage regions;
generate, based on a logical address transmitted by a host device, a physical address including a logical storage region address indicating one among the logical storage regions corresponding to the physical dies within a selected column of the array;
activate, through the channel, one among the physical dies within the selected column according to the logical storage region address; and
access the activated physical die according to the physical address.

12. The memory system according to claim 11,
further comprising a reference table configured to store relationship information among the logical storage region address, physical address indicating a physical storage region corresponding to the logical storage region indicated by the logical storage region address, and a selection signal for activating the physical storage region.

* * * * *